US011038706B2

(12) United States Patent
Malakuti et al.

(10) Patent No.: US 11,038,706 B2
(45) Date of Patent: Jun. 15, 2021

(54) METHOD FOR AUTOMATIC CONFIGURATION OF SEMATIC-BASED PROJECTS IN BUILDING AUTOMATION SYSTEMS

(71) Applicant: ABB Schweiz AG, Baden (CH)

(72) Inventors: Somayeh Malakuti, Dossenheim (DE); Johannes Schmitt, Ladenburg (DE); Thomas Gamer, Bruehl (DE)

(73) Assignee: ABB SCHWEIZ AG, Baden (CH)

( * ) Notice: Subject to any disclaimer, the term of this patent is extended or adjusted under 35 U.S.C. 154(b) by 21 days.

(21) Appl. No.: 16/293,668

(22) Filed: Mar. 6, 2019

(65) Prior Publication Data

US 2019/0280889 A1    Sep. 12, 2019

(30) Foreign Application Priority Data

Mar. 7, 2018   (EP) .................................... 18160509

(51) Int. Cl.
*H04L 12/28*    (2006.01)
*G06F 8/35*    (2018.01)
(Continued)

(52) U.S. Cl.
CPC .......... *H04L 12/2814* (2013.01); *G05B 15/02* (2013.01); *G06F 8/35* (2013.01);
(Continued)

(58) Field of Classification Search
CPC . H04L 12/2814; H04L 12/2807; H04L 69/08; H04L 41/145; H04L 12/281;
(Continued)

(56) References Cited

U.S. PATENT DOCUMENTS 7,734,572 B2 *  6/2010  Wiemeyer ............... H04L 43/06
                                                            700/19
2007/0233323 A1 * 10/2007  Wiemeyer ........... H04L 43/0817
                                                            700/276

(Continued)

FOREIGN PATENT DOCUMENTS

CN          204069020 U     12/2014
CN          105357111 A      2/2016
(Continued)

OTHER PUBLICATIONS

Schneider, Georg, "Modelling and Simulation of Standardised Control Functions from Building Automation", May 2017, International Modelica Conference, https://www.ep.liu.se/ecp/132/021/ecp17132209.pdf (Year: 2017).*

*Primary Examiner* — Charles R Kasenge
(74) *Attorney, Agent, or Firm* — Leydig, Voit & Mayer, Ltd.

(57) ABSTRACT

A computer-implemented method for semantic-based planning, engineering, and commissioning a project in a building or home automation system, using multiple technologies/protocols of devices including sensors, actuators and control devices, the method being based on a semantic based model having an automatic configuration generation for specific technologies/protocols from a function-based device specification, the method including the following multiple transformation steps: calculating/creating a configuration for a specific protocol/technology using a mapping complex or structure of rules or processing instructions that takes into account the semantic-based model, technology models, heuristics, and/or technology constraints of the devices; generating an internal model of the building automation system with communication objects as an output of the automatic created configuration calculation; transforming the internal model, depending on a targeted technology/protocol, in (Continued)

order to create either application programming interface (API) calls or a format for a mandatory tool, and downloading the created configuration into the building automation devices.

13 Claims, 4 Drawing Sheets

(51) Int. Cl.
 *G05B 15/02* (2006.01)
 *H04L 29/06* (2006.01)
 *H04L 12/24* (2006.01)

(52) U.S. Cl.
 CPC ........ *H04L 12/281* (2013.01); *H04L 12/2807* (2013.01); *H04L 41/145* (2013.01); *H04L 69/08* (2013.01); *G05B 2219/163* (2013.01); *G05B 2219/25011* (2013.01); *G05B 2219/25168* (2013.01); *G05B 2219/2642* (2013.01); *H04L 41/022* (2013.01); *H04L 41/0226* (2013.01); *H04L 41/0886* (2013.01)

(58) Field of Classification Search
 CPC ............. H04L 41/0886; H04L 41/0226; H04L 41/022; G06F 8/35; G05B 2219/163; G05B 2219/2642; G05B 15/02; G05B 2219/25011; G05B 2219/25168
 See application file for complete search history.

(56) References Cited

U.S. PATENT DOCUMENTS

| | | | |
|---|---|---|---|
| 2010/0241245 A1* | 9/2010 | Wiemeyer | H04L 12/2803 700/19 |
| 2013/0079903 A1* | 3/2013 | Kemmann | G08C 17/00 700/83 |
| 2018/0013579 A1* | 1/2018 | Fairweather | H04L 12/40032 |
| 2018/0074468 A1* | 3/2018 | Slupik | G06Q 30/0633 |
| 2018/0191858 A1* | 7/2018 | Jennequin | H04L 12/2818 |
| 2018/0299843 A1* | 10/2018 | Ray | G05B 15/02 |
| 2018/0299844 A1* | 10/2018 | Ray | G05B 13/0265 |
| 2018/0299845 A1* | 10/2018 | Ray | G06Q 10/063 |
| 2018/0299846 A1* | 10/2018 | Ray | G06Q 10/063 |

FOREIGN PATENT DOCUMENTS

| | | |
|---|---|---|
| CN | 105607527 A | 5/2016 |
| EP | 3309632 A1 | 4/2018 |

\* cited by examiner

METHOD FOR AUTOMATIC CONFIGURATION OF SEMATIC-BASED PROJECTS IN BUILDING AUTOMATION SYSTEMS

CROSS-REFERENCE TO PRIOR APPLICATION

Priority is claimed to European Patent Application No. EP 18 160 509.8, filed on Mar. 7, 2018, the entire disclosure of which is hereby incorporated by reference herein.

FIELD

The present invention generally relates to devices for use in building automation and more in particular relates to a computer-implemented method and system for semantic-based planning, engineering and commissioning a project in the building or home automation system.

BACKGROUND

Building automation or home automation systems are used in building or a part of a building, e.g. in functional buildings, hotels, office buildings, hospitals, apartment buildings etc. to configure or reconfigure the entire building, automation and the control of heating, cooling systems, ventilation and air conditioning systems, lighting, sun-shading systems, fire protection and/or security systems via the building visualization.

The building automation systems are facing the challenge of integrating and configuring many devices, as access control devices, heating and cooling systems, ventilation and air conditioning systems, lighting and sun-shading systems, fire protection and/or security systems.

These devices are heterogeneous in terms of their supported technologies/protocols and standards into one running system that actually controls the building automation devices installed in the building in the envisioned way.

Standardization in the use of the communication technology is available. Standardization provides conventions (or schemes) to be applied to the physical aspects and to the logical aspects (in particular to the protocols). However, standardization is limited. Some standards concern the physical aspects only, other standards concern the logical aspects only, and some standards concern both aspects. For building automation, standards are, for example, KNX, BACnet (Building Automation and Control Network), Zig-Bee, and LonWorks (local operating network).

Besides configuration of all those heterogeneous devices—preferably in a consistent and harmonized way that doesn't consider actual technology of the devices—communication between those devices during operation in order to control the building automation system is enabled by using gateways with integrated protocol translation and mapping.

In the documents CN 204069020 U and CN 105357111 A are disclosed ZigBee and KNX protocol transition and conversion gateways, comprising a KNX device or a KNX equipment, a ZigBee sensor and KNX-ZigBee integrated gateway device or equipment, wherein signals sent by the KNX device, passes the KNX-Zigbee integrated gateway device, and then the signals or data are forwarded to the KNX device or KNX equipment.

The document CN 105607527 A describes a KNX-BACnet/IP protocol conversion gateway based on Cortex-M processor, which is functionally divided to mainly comprise a KNX communication module, a gateway configuration module, a BACnet/IP communication module and a protocol conversion module.

All these approaches achieve inter-protocol interaction via explicit conversion among the protocols.

Furthermore, the disadvantages of the today's solutions lead to the problem that effort and complexity of integration and gateway configuration is error-prone and leads to failures in the building automation system, as following:
- several tools for planning, engineering and commissioning focused on a single technology/protocol each have to be used,
- incompatibility of these tools to exchange information digitally,
- excessive time and effort is required to learn these tools, and
- Gateway configuration is manual and not automated as result from those tools.

An approach for hiding the heterogeneity of various protocols—and thereby reducing failures in the configured building automation system—is to define a semantic model, to which various protocols and technologies can be mapped. In the building automation domain, for instance, the German national standard VDI 3813 (see also internationalized as ISO 16484) is applied for the planning and functional specification of a building automation system. The standard VDI 3813 provides a model for building structure and defines a set of function blocks that may exist in a building automation system, and their input, output and configuration parameters.

KNX is one of the most complex building automation protocols and is particularly focused on a method to map VDI 3813 concepts to KNX concepts, and thereby configure the KNX devices to perform their automation functionality. It is a standardized, OSI-based network communications protocol for building automation. The physical layer can be implemented by twisted pair wiring, by powerline networking, by radio, by an infrared line or by Ethernet. KNX uses a particular device description language that has its basis in XML (Extensible Markup Language).

It uses many concepts such as communication objects, group addresses, data point types, topology, areas and lines, which do not have any direct equivalent in VDI 3813 semantic model, and so far there has not been any work on mapping these concepts to each other.

While the concepts introduced by standard VDI 3813 are very abstract, KNX Association has introduced its notions of building topologies and installation for the KNX technology, which is one of the globally used technologies in building automation devices. Other examples are, e.g., the network communication protocols for building automation BACnet, ZigBee as an IEEE 802.15.4-based specification for a suite of high-level communication protocols used to create personal area networks for home automation, and LONworks as a further communication protocol used in buildings.

Zigbee relates to communication protocols used to create personal area networks with small, low-power digital radios. The physical layer and the medium access control (MAC) layer are implemented according to IEEE 802.15.4. The IEEE standard explains communication parameters, such as the applicability of different frequency bands.

In document EP 16193728 A1 a method of an automatic on-demand configuration in an automation system is disclosed and shows a semantic-based re-configuration and is focused on the required models, device types, device descriptions, etc. The method described therein regards to implement an automatic on-demand configuration or re-configuration in a building automation system during runtime based on data representing a plurality of devices of the building automation system comprising a unified information model. Data are available in a machine-readable format based on a sematic abstraction of the devices and during on-demand configuration or re-configuration the data bringing together in the unified information model by describing, importing, or on demand reading information about the devices, about the context of their installation and about their provided functionality as well as applying reasoning functionality such as matchmaking between the semantic abstraction for devices that using for planning of the system and the information about the devices or automatic solvers.

SUMMARY

In an embodiment, the present invention provides a computer-implemented method for semantic-based planning, engineering, and commissioning a project in a building or home automation system, using multiple technologies/protocols of devices including sensors, actuators and control devices, the method being based on a semantic based model comprising an automatic configuration generation for specific technologies/protocols from a function-based device specification, the method comprising the following multiple transformation steps: calculating/creating a configuration for a specific protocol/technology using a mapping complex or structure of rules or processing instructions that takes into account the semantic-based model, technology models, heuristics, and/or technology constraints of the devices; generating an internal model of the building automation system with communication objects comprising an output of the automatic created configuration calculation; transforming the internal model, depending on a targeted technology/protocol, in order to create either application programming interface (API) calls or a format for a mandatory tool, and downloading the created configuration into the building automation devices via the mandatory tool, or transforming the internal model, depending on a targeted technology/protocol, in order to create communication objects to be directly communicated to the devices, and downloading the created configuration directly to the devices; and creating a running building automation system, which is configured to achieve a building automation system using multiple technologies/protocols by translating between the sensors, actuators, and control devices.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
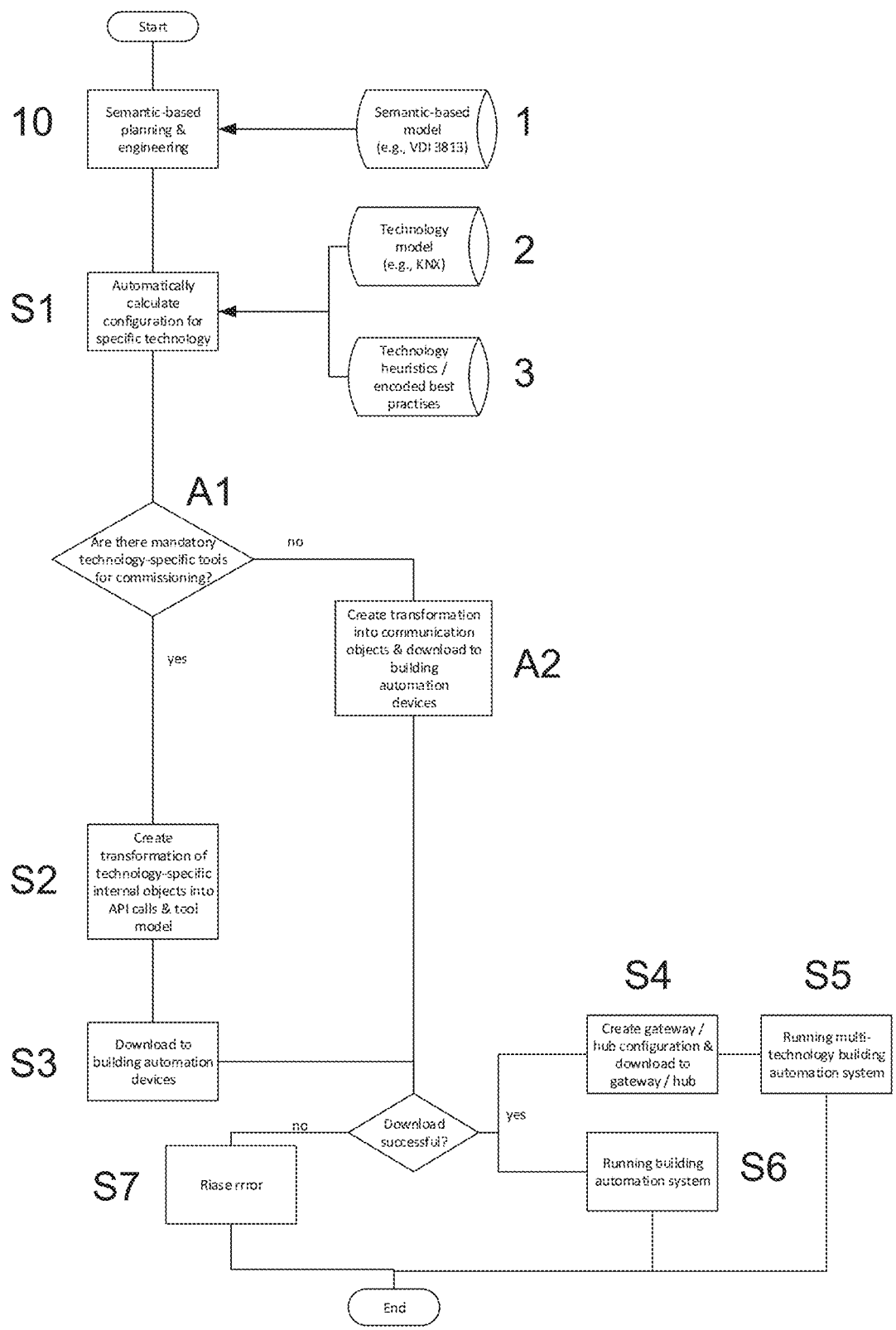
FIG. 1 shows an exemplary flowchart illustrating the steps of the method according to invention for automatic configuration for sematic-based projects in building or home automation system.

It is an object of the present invention to provide a computer-implemented method for semantic-based planning, engineering and commissioning a project in a building or home automation system, which supports planning, engineering, configuration, and commissioning of, for instance, KNX projects, becomes easier, less time consuming, and feasible for less skilled engineers—while creating less failures in the building or home automation system.

The above object of the invention has been achieved by the computer-implemented method for semantic-based planning, engineering and commissioning a project in a building or home automation system comprising the features described herein as well as by a system and a computer program product as described herein.

In an embodiment of the present invention provides a method is based on an inter-protocol interaction, which is achieved via a semantic abstraction level.

Prerequisite for the method is a function- or semantic-based, planning & engineering model, which is independent of any specific technology or protocol. Such semantic-based planning and engineering tool uses a semantic model as input, as e.g. standardized by VDI (Verein Deutscher Ingenieure) in its standard VDI 3813 "Building automation and control systems (BACS)—Fundamentals for room control"—or more specifically VDI 3813-2 "Building automation and control systems (BACS)—Room control functions (RA functions)". A functional specification for building automation system is available, wherein the building automation system doesn't have to automate an entire building but could also comprise just a single room or as site with multiple buildings.

The core aspect of this invention is the automatic semantic-based configuration generation to planning, engineering and commissioning a project in a building or home automation system using for specific technologies/protocols from a function-based specification.

This creates, in the end, a running building automation system as well as—optionally—a configuration for an automation network hub or controller, which is able to achieve a building automation system using multiple technologies/protocols, such as KNX, BACnet, ZigBee, LONworks by translating between the actual devices, e.g. sensors, actuators, and control devices, wherein it based on a semantic based model e.g. according standard VDI 3813, comprising an automatic configuration generation for specific technologies/protocols from a function-based device specification through the following multiple transformation steps.

In a first step it is calculated a configuration for specific protocol/technology by defining of a mapping complex or structure of rules or processing instructions (see detailed description below in conjunction with the drawings) by using the semantic-based model, technology models, as well as encoded heuristics and/or technology constraints into account of the devices, e.g., constraints to not place more than 64 devices in a KNX line, or best practice of keeping 20% of line free for future devices that must be added.

A technology model describes a certain building automation technology such as, for instance, KNX protocol. In addition, it provides a device description for devices implementing the technology. Such information then is used, e.g. for mapping of semantic elements to devices as a "light actuator" e.g. the KNX universal dimming actuator type UD/S 2.300.2 of ABB, for generation of device and communication addresses, e.g., KNX group addresses and for configuration of devices, e.g., KNX communication object values.

As output of this automatic configuration calculation, an internal model of the building automation system and its objects are generated.

In the next step the internal model is transformed depending on a targeted technology/protocol in order to create either application programming interface (API) calls or an import format for a mandatory tool, for instance engineering tool software for KNX. As defined by the tool, or communication objects to be directly communicated to the actual devices, e.g., ZigBee profiles or BACnet communication objects.

With a first alternative, the configuration is downloaded into the building automation devices via the mandatory tool. In a second alternative, the configuration is directly downloaded to the devices.

Finally, as an optional step, in case a building automation system makes use of multiple technologies, e.g., KNX, BACnet, ZigBee, LONworks, a configuration for a gateway/controller/network hub can be created in order to perform the required translation between devices of different technologies, as sensors, actuators and control devices, in the running building automation system.

Exemplarily, the described method and system for automatic configuration of building automation systems from semantic-based projects, is detailed for the transformation from VDI 3813-based semantic model to a running KNX-based building automation system via mandatory tool, e.g. Engineering Tool Software (ETS).

According to an aspect of the present invention is provided a system for semantic-based to planning, engineering and commissioning a project in a building or home automation system, using multiple technologies/protocols of devices, e.g. sensors, actuators and control devices, wherein it based on a semantic based model comprising an automatic configuration generation for specific technologies/protocols from a function-based device specification comprising a calculator/creator to configure specific protocol/technology, an internal model of the building automation system generating communication objects as output of this automatic created configuration and a mandatory tool.

The calculator/creator uses complex mapping rules, which take the semantic-based model, technology-models, heuristics and technology constraints into account to generate an internal model.

The internal model is provided to transform/create either application programming interface (API) calls or a format for a mandatory tool, depending on a targeted technology/protocol.

The mandatory tool downloading the created configuration into building automation devices, depending on a targeted technology/protocol in order to create communication objects to be directly communicated to the devices, the created configuration is directly downloaded to the devices, and to create a running building automation system, which is able to achieve a building automation system using multiple technologies/protocols by translating between the actual sensors, actuators, and control devices.

In summary, the new inventive method and system based on:

Mapping VDI 3813 buildings to ETS topologies and buildings by
defining the VDI concepts of portfolios, properties, building, areas, rooms, and segments are mapped to the ETS concepts of projects, installations, areas, lines, building and building parts, and
defining the structure of the building (locations, floors, rooms, devices . . . ) based on a Building Information Model (BIM).

Determining communication lines and areas by
forming a graph representation of the building topology by performing a graph traversal to identify lines and areas.

Generating KNX devices addresses by
assigning numbers to areas and lines as their address, using the assigned numbers to generate appropriate addresses and it takes the semantic-based model, technology models, as well as encoded heuristics or technology constraints into account.

Generating addresses by
assigning numbers to areas and lines as their addresses and using these numbers to generate appropriate addresses for devices Generating group addresses by
checking whether a communication object is the source or target of communication in function blocks, and accordingly assigning a group address.

Allocating data points types to communication object by
type mapping in a XML format which is used by the described complex or structure of rules or processing instructions to derive the right data point type for a communication object.

Commissioning ETS projects
generating one or more ETS projects/installations based on an XML schema for describing ETS projects or downloading the created configuration directly in the building automation devices.

A computer program product—when loaded into a memory of a computer and being executed by at least one processor of the computer—performs the steps of the computer-implemented method for configuring a plurality of building automation devices and for operating a technical system in a building.

According to an advantageous aspect of the invention is the fact that

Enabling technology to have a unified tool for semantic-based planning, engineering, and commissioning of building automation systems, where engineering models are defined agnostically from specific technologies and technology-specifics are also covered in models and heuristics to automatically create a technology-specific configuration.

Simplifying the planning and engineering of building automation systems and reducing the time/cost by eliminating the need for learning proprietary tools, and manual mapping, e.g., of standard VDI 3813 to KNX, based on KNX Association rules and enabling it for less skilled people by eliminating the need for learning proprietary tools and having a deep understanding of device technologies.

Tool support for automatically mapping VDI 3813 semantic models as defined in VDI 3813 standard to ETS projects, thereby automating the configuration of a KNX building automation system.

Extensible approach that can be used to address various semantic models such as free@home as input and technologies as BACnet, ZigBee, LonWorks and KNX as output format but focused on KNX.

Automatically creating the configuration for the gateway in multi-technology systems, translating between the different technologies.

Integrating KNX products with other technologies in building automation systems is easier.

The building automation planners and system integrators are able adopting a unified tool for semantic-based planning and engineering of building automation systems, where engineering models are defined agnostically from specific protocols and reducing the errors in engineering by automating technology-specific configuration.

FIG. 1 shows an exemplary flowchart illustrating the steps of the method according to invention for automatic configuration for sematic-based projects in building or home automation system based on a function- or semantic-based, planning & engineering model 1, e.g. according VDI 3813 standard rules.

A semantic-based planning and engineering tool 10 is provided to uses the semantic based model 1 as input, as standardized by VDI 3813.

In a first step S1 an automatic calculation of the configuration for specific protocol/technology is achieved by defining of a complex of rules or processing instructions by using the semantic-based model 1, the technology model based on KNX technology/protocol 2 and technology heuristics 3. As output of this automatic configuration calculation, an internal model of the building automation system and its technology-specific internal objects are generated.

In a next step S2 the generated internal model with the technology-specific internal objects is transformed on a targeted technology/protocol in order to create either application programming interface (API) calls or an import format for a mandatory tool, for instance, engineering tool software for KNX or the objects are directly communicated to the actual devices, e.g., ZigBee profiles or BACnet communication objects.

With the first alternative A1, the configuration is downloaded into the building automation devices via the mandatory tool. In the second alternative A2, the configuration is directly downloaded to the devices of the building automation system (see the following step S3). Alternatively the configuration is downloaded directly to the devices in the running building automation System (see step S6).

In case the building automation system make use of multiple technologies, a configuration for a gateway/hub/controller is created in order to perform a required translation between devices of different technologies/protocols (see step S4) and is used in the running multi-technology automation system (see step S5).

If the downloading of isn't successful a failure indication is appeared (see step S7).

The generic approach can be applied to various semantic models and target technologies, e.g. the semantic-based model uses the standards VDI 3813 and KNX in order to show the complexity and base concept for automatic configuration calculation.

Figure 2:
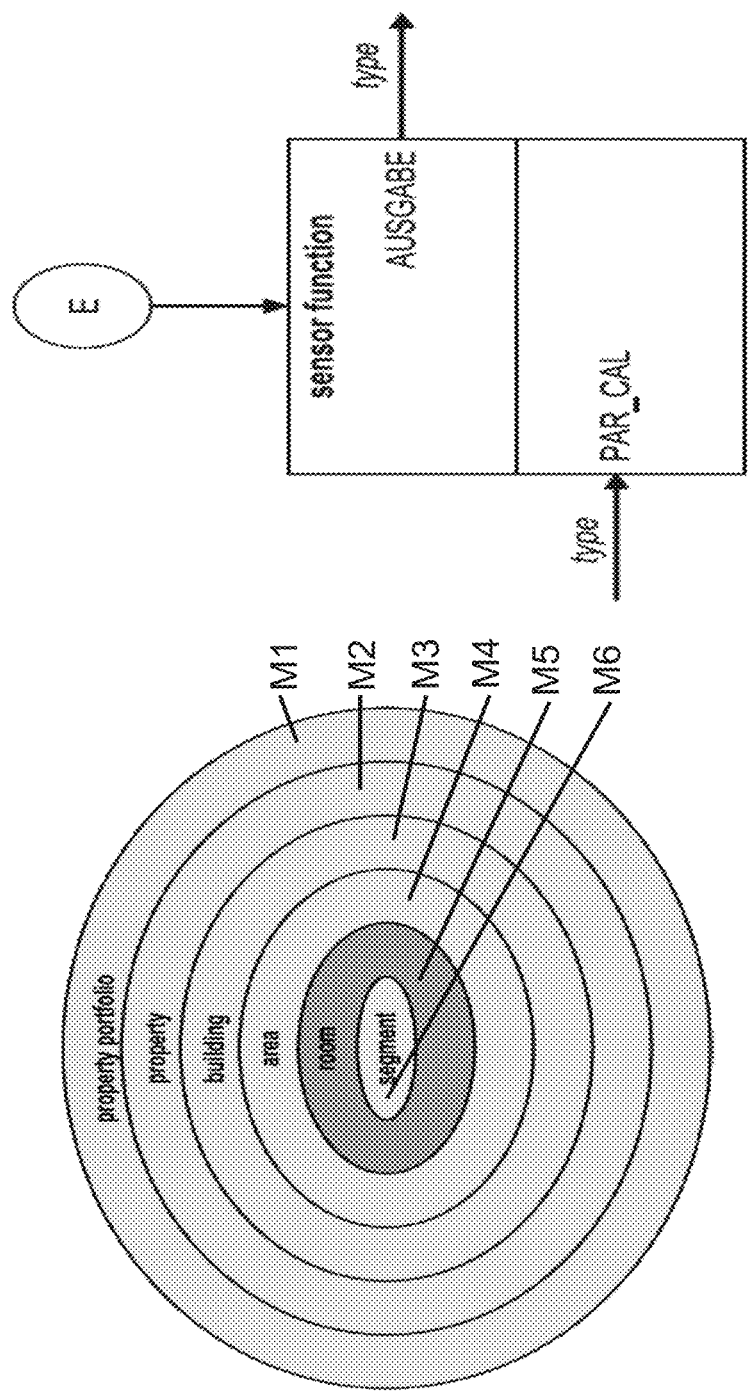
FIG. 2 shows an exemplary concept of a building topology and a function block regarding VDI3813 with state of art.

In FIG. 2 an exemplary concept M1-M6 of a building topology is shown regarding the standard VDI 3813-1 with state of art. It is provides a model of building topologies (see left side of FIG. 2). Here, a property portfolio M1 is the entirety of all properties in a person's possession. A property M2 is one or several usually adjoining buildings M3. A building M3 consists of one or several areas M4; and an area M4 contains one or rooms M5. An area M4 extends horizontally, vertically or in both directions. A room M5 contains one or more segments M6, and these segments M6 are the smallest units in building automation system, in which various building automation functions such as sensing, actuating, and control functions are applied.

An exemplary function block regarding the standard VDI3813-2 is shown on the right side of FIG. 2. In the standard VDI 3813-2 is defined a set of function blocks for building automation systems, wherein these functions are usually defined in terms of their input/output and internal parameters.

Figure 3:
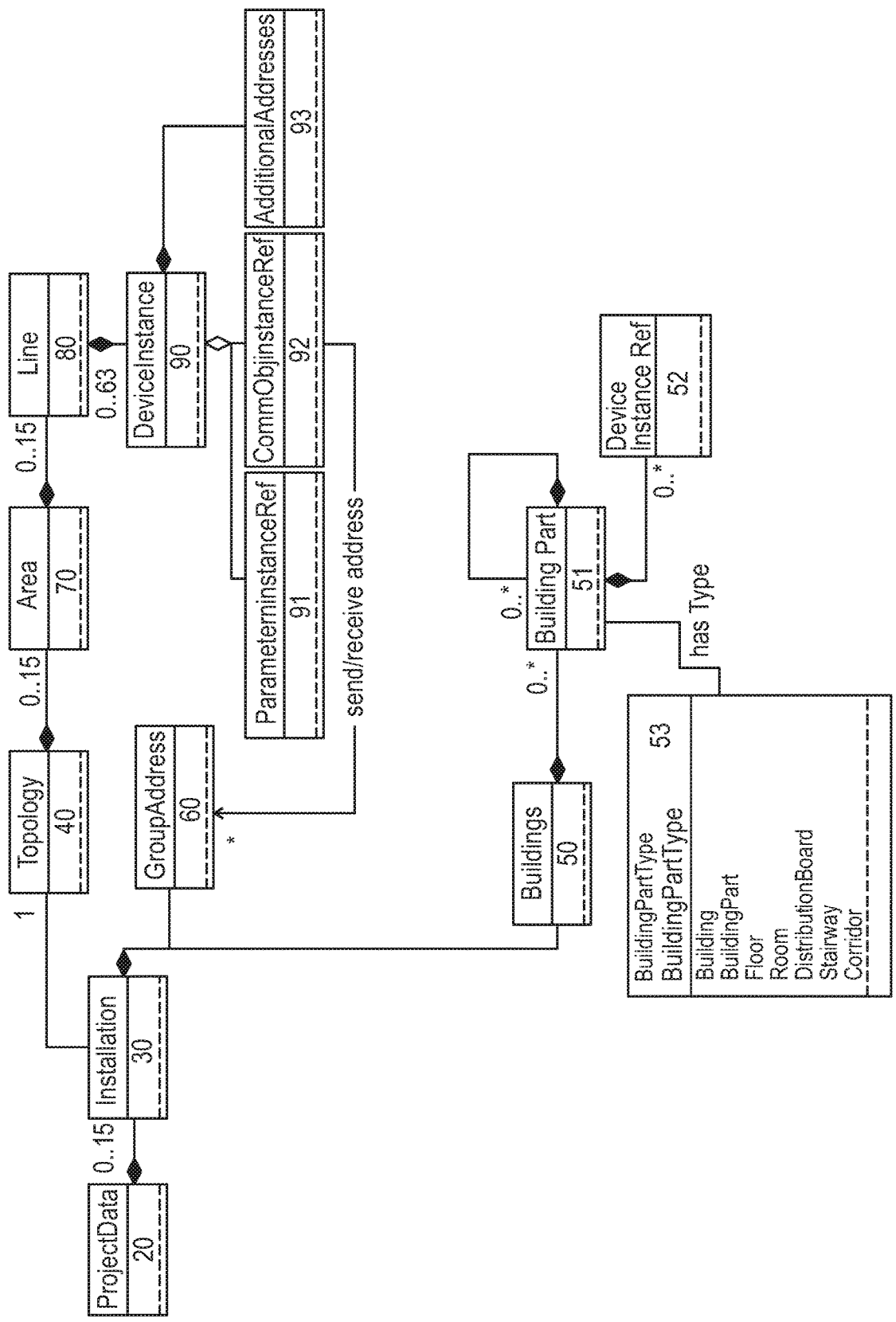
FIG. 3 shows an exemplary ETS concept of a project using the KNX technology/protocol with state of art.

In FIG. 3 an exemplary concept of a technology-specific project is described, which is based on the concepts of the Engineering Tool Software (ETS) for KNX-based building automation systems.

An ETS project 20 consists of one or more installations 30, which each has one topology 40, buildings 50 and a set of group addresses 60. Each topology 40 is identified by maximum 15 areas 70, each consisting of maximum 15 lines 80. A line 80 is either a logical or physical grouping of maximum 64 device instances 90, which are installed on the line 80 and can communicate with each other. Communications may also cross lines. Each device instance 90 has a set of parameters and communication objects 91, 92, 93. In KNX topology/protocol, group addresses 60, which are allocated to communication objects 92, are means to facilitate interactions of multiple devices with each other. Communication via group addresses 60 can be seen analogous to a multicast way of communications. A communication object 92 publishes a signal on a group address; all other communication objects 92 that have similar group addresses 60 can receive the signal and react to it.

As FIG. 3 shows, ETS projects 20 also have a notion of buildings, which consist of building parts. Building parts 51 can be room, corridors, floors 53, etc. Device instances 52 are associated to building parts 51, too.

By comparing the methods are described in the FIG. 2 and FIG. 3, it is shown that the semantic concepts regarding the standard VDI 3813 do not directly match the ones proposed by KNX Association. According to an aspect of the present invention, appropriate mapping rules and heuristics are developed to map these concepts to each other, so that semantic-based engineering and configuration of building automation system is facilitated.

In the following, those rules and heuristics are elaborated to mapping semantic-based building automation projects, which are defined based on VDI 3813 concepts, to ETS Topologies/protocols to create a KNX based building automation system automatically.

To generate ETS projects from VDI 3813-based engineering models, in a first step it is defined how the VDI concepts of portfolios, properties, building 50, areas 70, rooms, and segments of a building are mapped to the ETS concepts of projects, installations, areas 70, lines 80, building 50 and building parts 51. There are various constraints defined by the KNX organization, which are fulfilled while doing this mapping process.

Examples of such constraints are:
An area can consist of maximum 15 lines, and a line can contain maximum 64 devices.
As a best practice, it is recommended to keep 20% of line empty by having maximum 50 devices in a line.
Each line must have its own power supply unit.
The distance of two devices can be maximum 700 meter.
In architecting buildings, the structure of the building, location of fireplaces, placement of cables, cabinet and devices is planning by architects and electrical engineers in a physical information.

This physical information are defined in a Building Information Model (BIM) and are taken while mapping VDI 3813-based projects to ETS projects.

Exemplary, it is defined the following, extensible, rules or processing instructions to map VDI 3813-based projects to ETS projects:

Each VDI 3813 building is mapped to one or more ETS installations, depending on the number of devices, derived ETS lines and areas.

Each VDI 3813 building is mapped to one ETS building.

Each VDI 3813 room is mapped to one ETS room.

If the type of a VDI 3813 area is known, e.g. corridor, it is mapped to the corresponding building part in ETS building; otherwise, it is mapped to general building part.

Since ETS does not have the notion of segments, VDI segments are omitted and their devices are considered to be located in rooms.

Adjacent VDI 3813 segments/rooms are grouped into lines.

There can be maximum 50 devices in a line.

Each 15 lines are grouped to one area.

A line cannot go beyond an area.

For a VDI building, if the number of ETS areas within an installation reaches 15, a new ETS installation is created.

Figure 4:
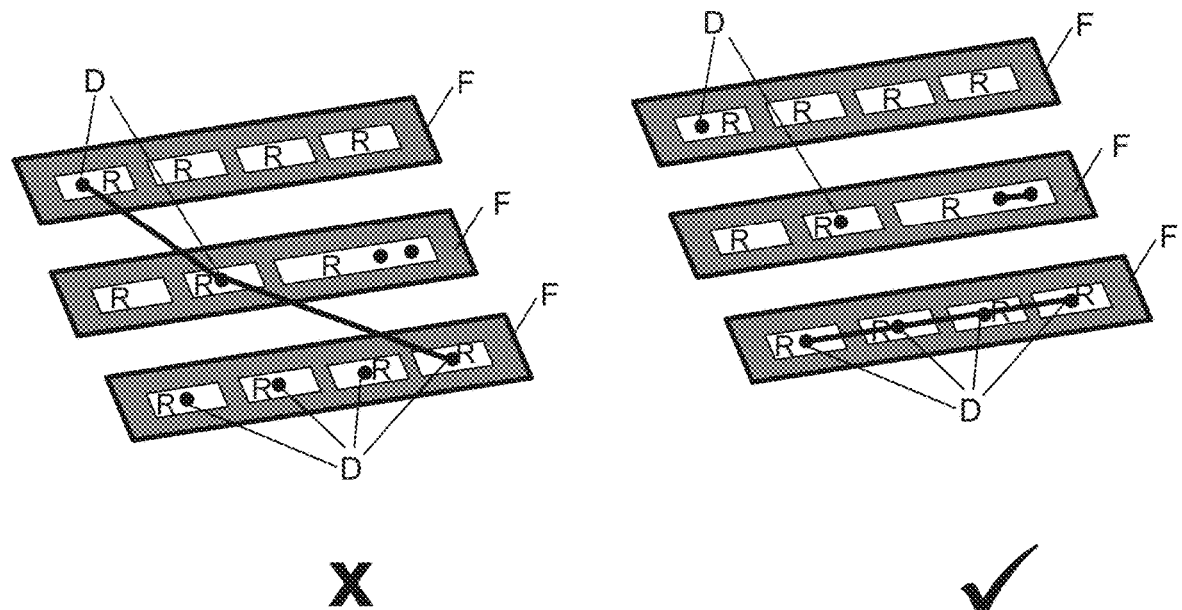
FIG. 4 shows an exemplary ETS topology, in which lines are used to connect adjacent devices.

These rules or processing instructions lead to one of best practices in defining ETS projects, in which lines are used to connect adjacent devices D, meaning that a line cannot go across multiple floors F. FIG. 4 shows an exemplary ETS topology, in which lines are used to connect adjacent devices, arranged in rooms R and the rooms R are arranged in floors F.

Figure 5:
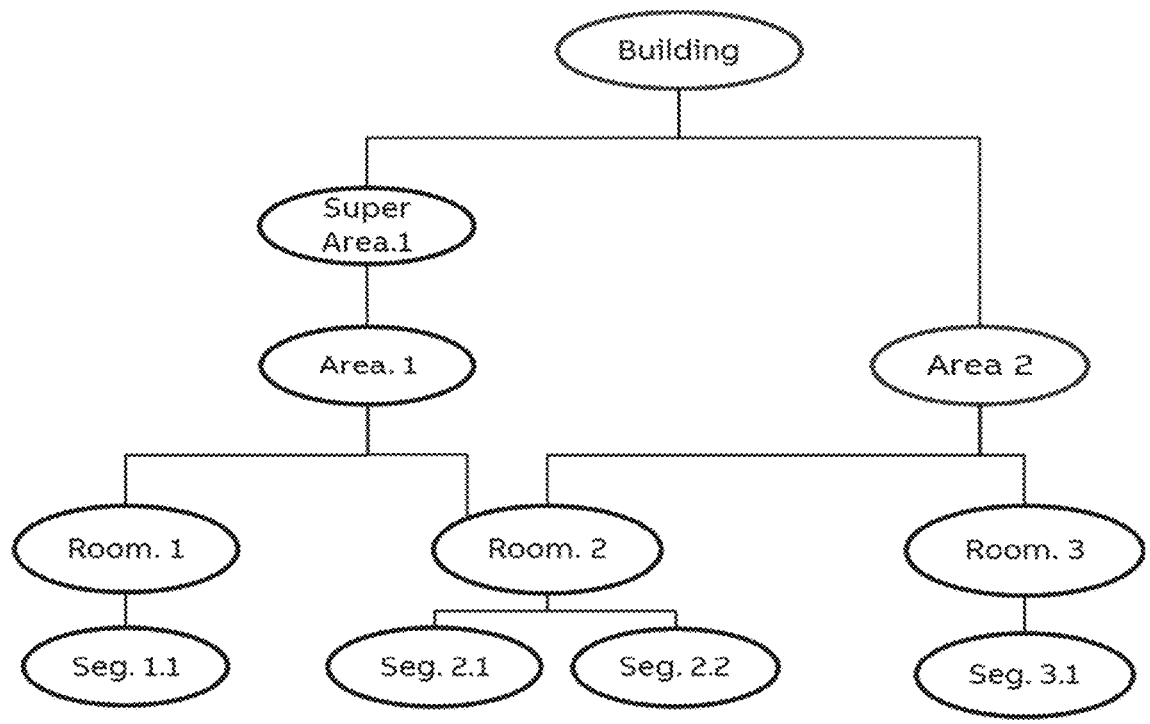
FIG. 5 shows an example building structure graph.

By using a complex or structure of rules or processing instructions it is formed a building structure graph representation of VDI 3813 building topology, and performs depth-first graph traversal to identify lines and areas. Consider for example the example graph shown in FIG. 5.

The depth-first graph traversal parses the nodes in the following order:

Seg. 1.1, Room 1, Seg. 2.1, Seg. 2.2., Room 2, Area 1, Super Area 1, Seg. 3.1, Room 3, Area 2. Since Room 2 is associated to two areas, only the first area that is traversed (i.e. Area.1) is considered. To form lines, Area.1 and its sub-tree will be placed to one or more lines, depending on the number of devices D.

Likewise, Area.2 and its sub-tree will be allocated to separate lines. The complex or structure of rules or processing instructions ensures that a line does not go across Area.1 and Area.2 even if the number of devices in the line is less than 50.

In KNX, devices D don't come with predefined addresses. Instead, device addresses are determined in ETS projects based on the allocation of devices D to lines and areas. After determining the lines and areas, the complex or structure of rules or processing instructions assigns numbers to areas and lines as their address, and uses these numbers to generate appropriate addresses for devices D based on the following pattern:

| A = Area | L = Line | B = Bus device |
|---|---|---|
| A A A A | L L L L | B B B B B B B B |
| 4 bit | 4 bit | 1 byte |

VDI 3813-based engineering models represent function blocks in different building parts, how they are connected to each other via their input and output ports, and to which devices these function blocks are bound.

As a result, there is a mapping from function block ports I/O (Input/Output) ports to the I/O ports of the devices. In case of KNX, these I/O ports are named communication objects. According to the KNX specifications, a communication object may have maximum one group address to send signal, and may have multiple group addresses to receive signals. To respect this, it is checked by this rule or processing instruction whether a communication object is the source or target of communication in function blocks, and accordingly assigns the group address. Group addresses are randomly generated numbers that match the expected pattern of ETS tool.

The size and type compatibility of communication objects influence the facilitate communication. For example, a communication object with 1-bit size cannot communicate with a communication object with 1-byte size. KNX has the concept of data point types for communication objects to enforce this, and KNX organization has defined a list of supported data point types. For example, the data point type with the code DPST-5-1 is an 8-bit value representing percentage of scaling. However, the problem is that not all communication objects have data point types.

In this case, it is suggest to derive data point type of communication objects from the data type of VDI 3813 function block ports.

The challenge is that the data types in VDI 3813 are very abstract and not precisely defined by VDI 3813. This means that a semantic type might be mapped to multiple data types in KNX. For example, LightType of VDI 3813 can be a switch or dimming in KNX; the former is 1 bit, and the latter is 1 byte representing dimming percentage.

To facilitate the mapping from semantic types to technology type, it is provided a type mapping in XML format which is used by the described complex or structure of rules or processing instructions to derive the right data point type for a communication object.

Below it is shows an excerpt of this semantic type mapping for KNX. Based on the side of communication object and the type of corresponding VDI 3813 port, it is selected the right data point type for a communication object by using the complex or structure of rules or processing instructions. For example, if the VDI port has the type LightType, and the corresponding communication objects is 1 bit, then DPST-1-1 is selected as the data point type.

```
- <ibase:KNXTypeMapping SemanticTypeRef="LightType">
    <KNXTypeRef>DPST-1-1 </KNXTypeRef>
    <KNXTypeRef>DPST-5-1 </KNXTypeRef>
  </ibase:KNXTypeMapping>
```

After all necessary KNX-specific information is generated from the VDI 3813 engineering models, it is provided to generate one or more ETS projects/installations for each VDI 3813 building based on the complex or structure of rules or processing instructions. KNX Organization has defined an XML schema for describing ETS projects, which is adopted by the complex or structure of rules or processing instructions to describe the target ETS projects. Alternatively, the created configuration can be directly downloaded into building automation devices, e.g., via KNX controller mode.

The usage of the ETS tool is mandatory for KNX today, based on KNX Association rules. Technically configuration can be downloaded directly and thus, running system can be created with our method directly or indirectly via ETS.

In summary, the Building Information Model (BIM) or export of an electrical planning tool can help to grasp an understanding about building structure, geometry information, cable placement, etc. Such information plus domain knowledge and best practices in defining ETS topologies can help to improve the mappings. Currently, the best practice (see FIG. 4) as well as KNX recommendations (e.g. keeping 20% of the line free) are considered. The best practices may differ per country according to the rules of that country, and there is no list of best practices available.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for semantic-based planning, engineering, and commissioning a project in a building or home automation system, using multiple technologies/protocols of devices including sensors, actuators and control devices, the method being based on a semantic-based model comprising an automatic configuration generation for specific technologies/protocols from a function-based device specification, the method comprising the following multiple transformation steps:
   calculating/creating a configuration for a specific protocol/technology using a mapping complex or structure of rules or processing instructions that takes into account the semantic-based model, technology models, heuristics, and/or technology constraints of the devices, wherein an output of the automatically created configuration calculation comprises a respective address assigned to each device based on a line associated with an area within the building or the home automation system where the respective device is located, wherein the line is used to connect the devices that are adjacent to each other;
   generating an internal model of the building or the home automation system with communication objects based on the output of the automatically created configuration calculation;
   transforming the internal model, depending on a targeted technology/protocol, in order to create either application programming interface (API) calls or a format for a mandatory tool, and downloading the created configuration into the building automation devices via the mandatory tool, or transforming the internal model, depending on a targeted technology/protocol, in order to create communication objects to be directly communicated to the devices, and downloading the created configuration directly to the devices; and
   creating a running building automation system, which is configured to achieve a building automation system using multiple technologies/protocols by translating between the sensors, actuators, and control devices.

2. The method according to claim 1, wherein a device description for the devices is provided such information, then is used for mapping of semantic elements to the devices, for generation of the device and/or communication addresses, and/or for configuration of the devices.

3. The method according to claim 2, wherein the devices comprise KNX communication objects.

4. The method according to claim 3, wherein according to KNX specifications, the communication is based on a maximum of one group address to send a signal and multiple group addresses to receive signals, the method further comprising checking, according to the KNX specifications or a processing instruction, whether a communication object is a source or target of communication in function blocks, and accordingly assigning the group address.

5. The method according to claim 4, wherein communication objects without data point types derive data point type communication objects from a data type of VDI 3813 function block ports.

6. The method according to claim 1, wherein the technology models describe a certain building automation technology/protocol, and wherein the semantic based model is based on a German national standard VDI 3813.

7. The method according to claim 6, wherein the certain building automation technology/protocol comprises KNX, BACnet, and/or ZigBee.

8. The method according to claim 1, wherein the configuration is downloaded into the building automation devices via the mandatory tool or directly to the devices.

9. The method according to claim 1, wherein the tool or the objects communicate directly to the devices of the building or the home automation system using ZigBee profiles or BACnet communication objects.

10. The method according to claim 1, wherein a configuration for a gateway, controller, or network hub is created in order to perform translation between devices of different technologies in the running building automation system.

11. The method according to claim 1, wherein the semantic based model comprises a VDI 3813 based semantic model to a running KNX-based building automation system via the mandatory tool executed as an engineering tool software.

12. A processing system comprising one or more hardware processors configured for semantic-based planning, engineering, and commissioning a project in a building or home automation system, using multiple technologies/protocols of devices includes sensors, actuators, and control devices, the system being based on a semantic based model comprising an automatic configuration generation for specific technologies/protocols from a function-based device specification, wherein the one or more hardware processors are configured to:

calculate/create a configuration for a specific protocol/technology, using a mapping complex or structure of rules or processing instructions that takes into account the semantic-based model, technology models, heuristics, and/or technology constraints of the sensors, actuators, and control devices, wherein an output of the automatically created configuration calculation comprises a respective address assigned to each device based on a line associated with an area within the building or the home automation system where the respective device is located, wherein the line is used to connect the devices that are adjacent to each other;

generate an internal model of the building or the home automation system with communication objects based on the output of the automatic created configuration calculation;

transform the internal model, depending on a targeted technology/protocol, in order to create either application programming interface (API) calls or a format for a mandatory tool;

download the created configuration into building automation devices via the mandatory tool, or transform the internal model, depending on a targeted technology/protocol in order to create communication objects to be directly communicated to the devices, the created configuration being directly downloaded to the devices, and create a running building automation system, which is configured to achieve a building automation system using multiple technologies/protocols by translating between the sensors, actuators, and control devices.

13. A non-transitory computer-readable medium comprising code that when loaded into a memory of a computer and executed by at least one processor of the computer is configured to perform the steps of the computer-implemented method according to claim 1.

* * * * *